(12) United States Patent
Kanno et al.

(10) Patent No.: US 8,501,350 B2
(45) Date of Patent: Aug. 6, 2013

(54) LITHIUM MANGANESE COMPOSITE OXIDE

(75) Inventors: Ryoji Kanno, Yokohama (JP); Makoto Yoshioka, Yasu (JP); Yoshihiro Kawakami, Moriya (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 233 days.

(21) Appl. No.: 11/843,927

(22) Filed: Aug. 23, 2007

(65) Prior Publication Data

US 2008/0206644 A1    Aug. 28, 2008

(30) Foreign Application Priority Data

Feb. 27, 2007 (JP) .................................. 2007-046778

(51) Int. Cl.
*H01M 4/50* (2010.01)
*H01M 4/13* (2010.01)

(52) U.S. Cl.
USPC .................... 429/224; 429/231.95; 429/231.1; 429/209

(58) Field of Classification Search
USPC ............... 429/209, 218.1, 231.9, 231.95, 224
See application file for complete search history.

(56) References Cited

U.S. PATENT DOCUMENTS

| 4,564,567 | A * | 1/1986 | Kucera et al. | 429/41 |
| 7,521,152 | B2 * | 4/2009 | Takeda et al. | 429/231.95 |
| 2003/0035999 | A1 * | 2/2003 | Gao et al. | 429/231.1 |
| 2003/0134186 | A1 * | 7/2003 | Shizuki | 429/94 |

FOREIGN PATENT DOCUMENTS

| JP | 1-209663 | A | 8/1989 |
| JP | 3-119656 | A | 5/1991 |
| JP | 5-283077 | A | 10/1993 |
| JP | 05325961 | A * | 12/1993 |
| JP | 9-110431 | A | 4/1997 |
| JP | 2002-068748 | A | 3/2002 |
| JP | 2003-048718 | A | 2/2003 |
| JP | 2005-063673 | A | 3/2005 |
| JP | 2005-71807 | A | 3/2005 |
| JP | 2007-503102 | A | 2/2007 |
| JP | 2008-511960 | A | 4/2008 |

OTHER PUBLICATIONS

D. Pasero et al., "Oxygen Nonstoichiometry in Li2MnO3: An Alternative Explanation for Its Anomalous Electrochemical Activity", Chemistry of Materials 2005, 17, pp. 345-348.*

Dean, John A., ed. Lange's Handbook of Chemistry. Fifteenth Edition. New York: McGraw-Hill, 1999.*

D. Pasero, et al. "Oxygen Nonstoichiometry in $Li_2MnO_3$: An Alternative Explanation for Its Anomalous Electrochemical Activity", Chem. Mater. (2005), 17, pp. 345-348.

* cited by examiner

Primary Examiner — Edu E Enin-Okut
(74) Attorney, Agent, or Firm — Sughrue Mion, PLLC

(57) ABSTRACT

To provide a lithium manganese composite oxide capable of improving the initial discharge capacity of secondary batteries by removing more Li ions than the conventional lithium manganese composite oxide does when used in the positive electrode used for secondary batteries. A lithium manganese composite oxide having a $Li_2MnO_3$ type crystal structure, wherein a part of Li and/or Mn in a lithium manganese oxide represented by a formula $Li_2MnO_3$ is substituted by one or more doping elements M selected from the group consisting of Ti, Zr, Hf, V, Nb, Ta, Si, Ge, Sn, P, Sb and Bi. The above-described lithium manganese composite oxide, wherein the doping elements are P and/or Si. A positive electrode used for nonaqueous electrolyte secondary batteries, comprising the above-described lithium manganese composite oxide. A nonaqueous electrolyte secondary battery comprising the above-described positive electrode used for nonaqueous electrolyte secondary batteries.

2 Claims, 2 Drawing Sheets

LITHIUM MANGANESE COMPOSITE OXIDE

BACKGROUND OF THE INVENTION (1) Field of the Invention

The present invention relates to lithium manganese composite oxides, and in particular relates to the lithium manganese composite oxides used in the positive electrode used for secondary batteries.

(2) Description of the Related Art

Lithium manganese composite oxides are used for the positive electrode of secondary batteries, such as an aqueous electrolyte secondary battery and a nonaqueous electrolyte secondary battery. The secondary batteries have been already put in practical use as the power supply for mobile phones, notebook computers, and the like. Furthermore it is attempted to use the secondary batteries also in mid-to-large scale applications, such as automobile applications, electric power storage applications, and the like.

As the lithium manganese composite oxides used in the positive electrode of the conventional secondary batteries, those having a formula $Li_{2-x}Mn_{1-y}M_yO_{3-Z}$ (wherein M is one or more selected from the group consisting of Fe, Al, Ni, and Co, and $0<x<=0.9$, $0<=y<=0.5$, $0<Z<=0.9$) are disclosed in JP-A-2005-071807 (see the claims, and Paragraph [0018] in the specification). The publication also describes that because, in $Li_2MnO_3$, Mn is tetravalent and stable and Li ions are unlikely to be removed and electrochemically stable, $Li_2MnO_3$ usually does not exhibit charge and discharge reactions, nevertheless, by depriving oxygen to make the valence of Mn four or less, as in the lithium manganese composite oxides represented by the above-described formula, it is possible to remove Li ions until the valence of Mn becomes four, resulting in exhibiting the reversible charge and discharge reaction.

SUMMARY OF THE INVENTION

However, when the conventional lithium manganese composite oxide is used in the positive electrode used for secondary batteries, Li ions can be removed only until the valence of Mn becomes four, which is not satisfactory in terms of the initial discharge capacity of secondary batteries. It is an object of the present invention to provide lithium manganese composite oxides capable of improving the initial discharge capacity of secondary batteries by removing more Li ions than the conventional lithium manganese composite oxide does when used in the positive electrode used for secondary batteries.

As a result of various studies, the present inventors found out that the following lithium manganese composite oxides in which specific doping elements are used meet the above-described object, which has led to the present invention.

That is, the present invention provides the following inventions.

<1> A lithium manganese composite oxide having a $Li_2MnO_3$ type crystal structure, wherein a part of Li and/or Mn in a lithium manganese oxide represented by a formula $Li_2MnO_3$ is substituted by one or more doping elements M selected from the group consisting of Ti, Zr, Hf, V, Nb, Ta, Si, Ge, Sn, P, Sb and Bi.

<2> The lithium manganese composite oxide according to the above <1>, wherein the doping elements are P and/or Si.

<3> The lithium manganese composite oxide having a $Li_2MnO_3$ type crystal structure according to the above <1> or <2>, wherein a part of Li in the lithium manganese oxide represented by the formula $Li_2MnO_3$ is substituted by the doping element M.

<4> The lithium manganese composite oxide according to the above <3>, wherein the doping element is P and the lithium manganese composite oxide is represented by the following formula (1A).

$$Li_{2-x}P_{x/5}MnO_3 \quad (1A)$$

(wherein x is a value within the range of greater than 0 and 0.6 or less.)

<5> The lithium manganese composite oxide according to the above <3>, wherein the doping element is Si and the lithium manganese composite oxide is represented by the following formula (2A).

$$Li_{2-x}Si_{x/4}MnO_3 \quad (2A)$$

(wherein x is a value within the range of greater than and 0.6 or less.)

<6> The lithium manganese composite oxide having a $Li_2MnO_3$ type crystal structure according to the above <1> or <2>, wherein a part of Mn in the lithium manganese oxide represented by the formula $LiMnO_3$ is substituted by the doping element M.

<7> The lithium manganese composite oxide according to the above <6>, wherein the doping element is P and the lithium manganese composite oxide is represented by the following formula (1B).

$$Li_2Mn_{1-y}P_{4y/5}O_3 \quad (1B)$$

(wherein y is a value within the range of greater than 0 and 0.3 or less.)

<8> The lithium manganese composite oxide according to the above <6>, wherein the doping element is Si and the lithium manganese composite oxide is represented by the following formula (2B).

$$Li_2Mn_{1-y}Si_yO_3 \quad (2B)$$

(wherein y is a value within the range of greater than 0 and 0.3 or less.)

<9> A positive electrode used for nonaqueous electrolyte secondary batteries, comprising the lithium manganese composite oxide according to any one of the above <1> to <8>.

<10> A nonaqueous electrolyte secondary battery, comprising the positive electrode used for nonaqueous electrolyte secondary batteries according to the above <9>.

According to the present invention, it is possible to provide lithium manganese composite oxides capable of improving the initial discharge capacity of secondary batteries by removing more Li ions than the conventional lithium manganese composite oxide does when used in the positive electrode used for secondary batteries. Thus, these lithium manganese composite oxides are useful particularly in nonaqueous electrolyte secondary batteries requiring energy density, i.e., the nonaqueous electrolyte secondary batteries used for compact size multifunctional portable devices, automotives, power tools, and the like, and thus the present invention is industrially extremely useful.

PREFERRED EMBODIMENT OF THE INVENTION

Figure 1:
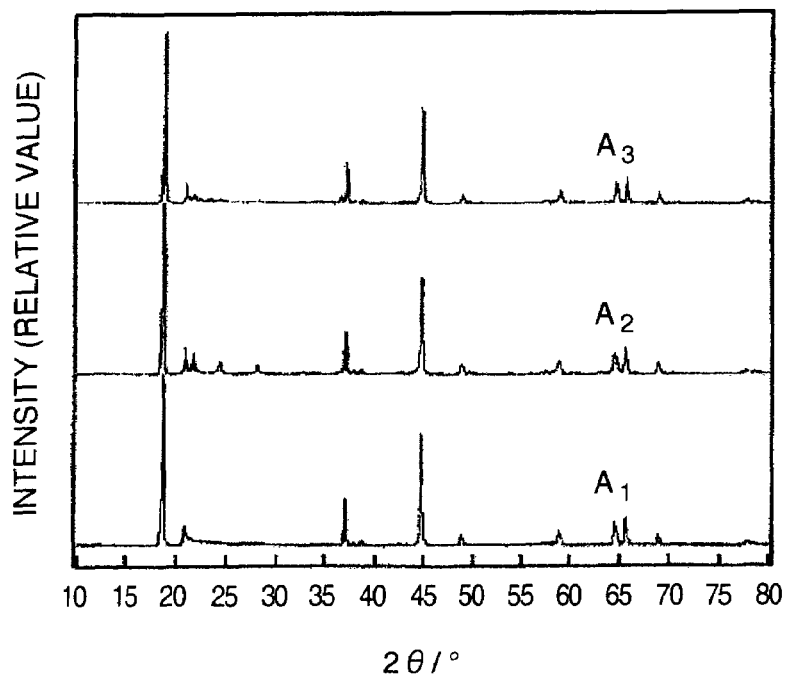
FIG. 1 is a view showing powder X ray diffraction patterns of powders A1, A2, and A3 in Examples.

The present invention provides lithium manganese composite oxides having a $Li_2MnO_3$ type crystal structure, wherein a part of Li and/or Mn in a lithium manganese oxide represented by the formula $Li_2MnO_3$ is substituted by one or more doping elements M selected from the group consisting of Ti, Zr, Hf, V, Nb, Ta, Si, Ge, Sn, P, Sb, and Bi.

According to the periodic table (long period form) of elements, in the doping elements M in the present invention, Ti, Zr and Hf belong to Group 4b; V, Nb and Ta belong to Group 5b; Si, Ge and Sn belong to Group 4a; and P, Sb and Bi belong to Group 5a. In the present invention, when a part of Li and/or Mn in the lithium manganese oxide represented by the formula $Li_2MnO_3$ is substituted by the above-described doping element M, the obtained lithium manganese composite oxide provides improved initial discharge capacity of secondary batteries by removing more Li ions than the conventional lithium manganese composite oxide does. The present inventors believe that in the conventional lithium manganese composite oxide the maximum valence of Mn is tetravalent, nevertheless, in the lithium manganese composite oxide of the present invention, even if the valence of Mn becomes 5 or 6, Mn with these valences can electrochemically stably exist in the $Li_2MnO_3$ type crystal structure, so that Li ions can be removed until the valence of Mn becomes 5 or 6, thus resulting in a lithium manganese composite oxide capable of improving the initial discharge capacity of secondary batteries by removing more Li ions than the conventional lithium manganese composite oxide does.

In the present invention, if the lithium manganese composite oxide has a $Li_2MnO_3$ type crystal structure, the quantity of substitution by the above-described doping element M is not particularly limited. However, a preferable range of the quantity of substitution is that 30 mol % or less of the Li and/or Mn in the lithium manganese oxide represented by the formula $Li_2MnO_3$ is substituted by the above-described doping element M. Moreover, a more preferable range is 20 mol % or less. Moreover, in the present invention, for the quantity of substitution by the doping element M, a total valence of Li and/or Mn (mole) to be substituted is preferably matched with a total valence of M (mole) to substitute.

In terms of further increasing the effect of the present invention, the above-described doping elements are preferably P and/or Si. The more preferable doping element is Si.

Next, the present invention will be described using suitable examples of the lithium manganese composite oxide of the present invention, i.e., the lithium manganese composite oxides having the $Li_2MnO_3$ type crystal structure, wherein a part of Li in the lithium manganese oxide represented by the formula $Li_2MnO_3$ is substituted by a doping element M (wherein M has the meaning as defined above), and wherein the doping elements are P and/or Si.

The lithium manganese composite oxide of the present invention is preferably represented by the following formula (1A) when the doping element is P.

$$Li_{2-x}P_{x/5}MnO_3 \quad (1A)$$

(wherein x is a value within the range of greater than 0 and 0.6 or less.)

In the above-described formula (1A), a preferable range of x is the range of greater than 0 and 0.4 or less.

The lithium manganese composite oxide of the present invention is preferably represented by the following formula (2A) when the doping element is Si.

$$Li_{2-x}Si_{x/4}MnO_3 \quad (2A)$$

(wherein x is a value within the range of greater than 0 and 0.6 or less.)

In the above-described formula (2A), a preferable range of x is the range of greater than 0 and 0.4 or less.

Next, the present invention is described using suitable examples of the lithium manganese composite oxide of the present invention, i.e., the lithium manganese composite oxide having the $Li_2MnO_3$ type crystal structure, wherein a part of Mn in the lithium manganese oxide represented by the formula $Li_2MnO_3$ is substituted by a doping element M (wherein M has the same meaning as the above), and wherein the doping elements are P and/or Si.

The lithium manganese composite oxide of the present invention is preferably represented by the following formula (1B) when the doping element is P.

$$Li_2Mn_{1-y}P_{4y/5}O_3 \quad (1B)$$

(wherein y is a value within the range of greater than 0 and 0.3 or less.)

In the above-described formula (1B), a preferable range of y is the range of greater than 0 and 0.2 or less.

The lithium manganese composite oxide of the present invention is preferably represented by the following formula (2B) when the doping element is Si.

$$Li_2Mn_{1-y}Si_yO_3 \quad (2B)$$

(wherein y is a value within the range of greater than 0 and 0.3 or less.)

In the above-described formula (2B), a preferable range of y is the range of greater than 0 and 0.2 or less.

In the present invention, by employing the lithium manganese composite oxide represented by the above-described formulas (1A), (1B), (2A), and (2B) in the positive electrode used for secondary batteries, it is possible to improve the reversibility at the time of charging and discharging as well as the capacity retention of the secondary batteries.

Moreover, a part of Li and/or Mn of the lithium manganese composite oxide may be further substituted by other elements than the doping element M, such as B, Al, Ga, In, Ge, Mg, Sc, Y, Cr, Mo, W, Tc, Ru, Rh, Ir, Pd, Cu, Ag, and Zn, as long as the effect of the present invention is not impaired.

The crystal structure of the lithium manganese composite oxide of the present invention is a $Li_2MnO_3$ type crystal structure, which usually belongs to the monoclinic system. This crystal structure is identified by means of powder X-ray diffractometry or electron beam diffractometry.

Moreover, in the lithium manganese composite oxide of the present invention, a compound containing one or more elements selected from the group consisting of B, Al, Ga, In, Si, Ge, Sn, Mg and transition metal elements may be adhered onto the surface of a particle of the lithium manganese composite oxide. Among the above-described elements, one or more selected from the group consisting of B, Al, and Mg, Co and Cr are preferable, with Al being more preferable for its operability. The above-described compounds include, for example, oxide, hydroxide, oxy hydroxide, carbonate, nitrate, organic acid salt of the above-described elements and the mixture thereof. Among them, oxide, hydroxide, oxy hydroxide or the mixture thereof is preferable. Among the above-described compounds, a more preferable one is alumina.

Next, a method of producing the lithium manganese composite oxide of the present invention is described. The lithium manganese composite oxide of the present invention can be produced by firing a mixture of metal compounds that can form the lithium manganese composite oxide of the present invention by firing. That is, the lithium manganese composite oxide of the present invention can be produced by firing a mixture of metal compounds that is obtained by weighing compounds containing corresponding metal elements so as to have a predetermined composition and mixing the same. For example, a lithium manganese composite oxide represented by formula $Li_{1.9}P_{0.02}MnO_3$, which is one of the preferable compositions, can be obtained by firing a mixture of metal compounds that is obtained by weighing lithium carbonate ($Li_2CO_3$), lithium phosphorate ($Li_3PO_4$) and manganese carbonate ($MnCO_3$) so that the molar ratio of Li:P:Mn becomes 1.90:0.02:1.00 and mixing the same.

Among the compounds containing the elements Li, Mn, and M (wherein M has the meaning as defined above), for example, oxide or a compound which may be decomposed and/or oxidized into oxide at high temperature, such as hydroxide, oxy hydroxide, carbonate, nitrate, acetate, halide, oxalate and alkoxide can be used as the compound containing the above-described elements. The compound to be used may be suitably selected taking into consideration the operability, melting point, and the like. Among these, as the compound containing Li, hydroxide and/or carbonate are preferable, and as the compound containing Mn, the carbonate and/or oxide are preferable. Moreover, in the case where M is P, as the compound containing P, the phosphate is preferable, and in the case where M is Si, as the compound containing Si, the oxide is preferable and amorphous silicon dioxide is more preferable. Moreover, a composite compound containing two or more of the above-described metal elements may be used as the compound containing the metal elements.

In terms of improving the initial discharge capacity by enhancing the crystallizability of the lithium manganese composite oxide, the above-described mixture of metal compounds before firing may further contain a compound containing boron. The content of the compound containing boron is typically 0.00001 mol % or more and 5 mol % or less, preferably 0.00001 mol % or more and 3 mol % or less, in terms of boron relative to a total mole of the metal elements, other than lithium, in the above-described mixture of metal compounds. The compounds containing boron include boron oxide and boric acid, with boric acid being preferable. Moreover, here, the boron that is additionally contained in the mixture of metal compounds may remain in the lithium composite metal oxide of the present invention after firing, or may be removed by washing, evaporation, or the like.

Mixing of compounds containing the above-described metal elements may be carried out either by dry blending or by wet blending. The dry blending is simpler and thus preferable. As the dry-blending apparatus, a V-type mixer, W-type mixer, ribbon mixer, drum mixer, dry type ball mill, and the like may be used to carry out mixing.

The lithium manganese composite oxide of the present invention is obtained by compression molding the above-described mixture of metal compounds as needed and thereafter firing the same by keeping it in the temperature range from 600° C. to 1100° C. for 2 to 30 hours. Moreover, as the atmosphere of firing, air, oxygen, nitrogen, argon, or a mixed gas of these can be used, with the atmosphere containing oxygen being preferable. Moreover, the firing may be carried out under pressure.

The thus obtained lithium manganese composite oxide may be ground using a ball mill, jet mill, or the like, and the grinding and firing may be repeated two or more times. The obtained lithium manganese composite oxide may be washed or classified as needed.

The lithium manganese composite oxide of the present invention obtained as described above is suitable for the positive electrode of secondary batteries, such as aqueous electrolyte secondary batteries and nonaqueous electrolyte secondary batteries. The lithium manganese composite oxide of the present invention is used more suitably in the positive electrode used for nonaqueous electrolyte secondary batteries. Next, the positive electrode used for nonaqueous electrolyte secondary batteries comprising the lithium manganese composite oxide of the present invention is described.

The positive electrode used for nonaqueous electrolyte secondary batteries is produced by making a positive electrode mixture containing a positive active material, a conductive material and a binder supported on a positive electrode current collector. In the positive electrode used for nonaqueous electrolyte secondary batteries of the present invention, the above-described positive active material contains the lithium manganese composite oxide of the present invention. As the above-described conductive material, carbonaceous material can be used, and the carbonaceous materials include graphite powder, carbon black, acetylene black, and the like. Because the carbon black and acetylene black are fine particles and have a large surface area, it is possible to increase the conductivity inside the positive electrode and improve the charge and discharge efficiency and the rate capability by adding a small quantity thereof into the positive electrode mixture. However, too much addition decreases the binding property of the binder between the positive electrode mixture and the positive electrode current collector, causing the internal resistance to increase. Usually, the proportion of the conductive material in the positive electrode mixture is 5% by weight or more and 20% by weight or less.

As the above-described binder, thermoplastic resins can be used, and the thermoplastic resins specifically include: fluororesins, such as polyvinylidene fluoride (hereinafter, may be referred to as PVDF), polytetrafluoroethylene (hereinafter, may be referred to as PTFE), tetrafluoroethylene-propylene hexafluoride-vinylidene fluoride system copolymer, propylene hexafluoride-vinylidene fluoride system copolymer, and tetrafluoroethylene-perfluoro vinyl ether system copolymer; polyolefin resins, such as polyethylene and polypropylene; and the like. Moreover, two or more of these may be mixed for use. Moreover, by using a fluororesin and a polyolefin resin as the binder and adding the binder so that the proportion of the fluororesin becomes 1 to 10% by weight and the proportion of the polyolefin resin becomes 0.1 to 2% by weight with respect to the positive electrode mixture, a positive electrode mixture excellent in binding property with the positive electrode current collector can be obtained.

As the above-described positive electrode current collector, Al, Ni, stainless steel, and the like can be used, with Al being preferable because it is easily formed into a thin film and inexpensive. The methods of making the positive electrode mixture supported on the positive electrode current collector include a method of pressure forming and a method of making the positive electrode mixture into a paste with the use of an organic solvent or the like, then coating the paste onto the positive electrode current collector, drying the same and thereafter bonding these by pressing or the like. In the case where the positive electrode mixture is made into a paste, a slurry composed of a positive active material, a conductive material, a binder and an organic solvent is prepared. The organic solvents include: amine solvents, such as N, N-dimethylamino propylamine and diethylenetriamine; ether solvents, such as tetrahydrofuran; ketone solvents, such as methyl ethyl ketone; ester solvents, such as methyl acetate; amide solvents, such as dimethylacetamide and 1-methyl 2-pyrrolidone; and the like.

The methods of coating the positive electrode mixture onto the positive electrode current collector include, for example, a slit-die coating method, a screen coating method, a curtain coating method, a knife coating method, a gravure coating method, an electrostatic spray method, and the like.

By the method described above, the positive electrode used for nonaqueous electrolyte secondary batteries can be produced.

Nonaqueous electrolyte secondary batteries can be produced by the following method using the above-described positive electrodes for nonaqueous electrolyte secondary batteries. Specifically, nonaqueous electrolyte secondary batteries can be produced by housing an electrode group which is obtained by laminating and winding a separator, a negative electrode comprising a negative electrode mixture supported on a negative electrode current collector and the above-described positive electrode, in a battery can, and thereafter impregnating the electrode group with an electrolyte solution composed of an organic solvent containing electrolyte.

The shapes of the above-described electrode group include, for example, the shapes, whose cross section is a circle, an ellipse, a rectangular, a rectangular with roughly rounded off corners, and the like, when this electrode group is cut in the direction perpendicular to the winding axis. Moreover, the shapes of the battery include, for example, a paper type, a coin type, a cylinder type, a square type, and the like.

As the above-described negative electrode, a negative electrode current collector supporting a negative electrode mixture containing a material capable of doping and undoping lithium ions, lithium metal, lithium alloy or the like can be used. Here, the materials capable of doping and undoping lithium ions specifically include carbonaceous materials, such as natural graphite, artificial graphite, coke, carbon black, pyrolytic carbons, carbon fiber, and a fired product of organic polymer compound. Here, the charcogen compounds, such as oxide, sulfide, or the like capable of doping and undoping lithium ions at a potential lower than that of the positive electrode can be also used. As the carbonaceous material, carbonaceous materials composed mainly of graphite, such as natural graphite and artificial graphite, may be used because the potential flatness is high and the average discharge potential is low, and so on. The shape of the carbonaceous material may be any one of a flaky shape like natural graphite, a spherical shape like meso carbon micro beads, a fibrous shape like graphitized carbon fibers, or an aggregated fine powder, for example. In the case where the above-described electrolyte solution does not contain ethylene carbonate described below, use of the negative electrode mixture containing polyethylene carbonate may improve the cycle characteristic and high current discharge characteristic of the obtained battery.

The above-described negative electrode mixture may contain a binder as needed. As the binder, thermoplastic resins are included, and the thermoplastic resins may specifically include PVDF, thermoplastic polyimide, carboxymethylcellulose, polyethylene, polypropylene, and the like.

Moreover, the above-described charcogen compounds, such as oxide, sulfide, or the like, that are used as the material capable of doping and undoping lithium ions contained in the negative electrode mixture include charcogen compounds, such as crystalline or amorphous oxide, sulfide, or the like composed mainly of elements of Groups 13, 14, and 15 in the periodic table, and specifically amorphous compounds composed mainly of tin oxide, and the like. These can contain a carbonaceous material as a conductive material as needed.

As the above-described negative electrode current collector, Cu, Ni, stainless steel, and the like are included, among which Cu may be suitably used because it is unlikely to form an alloy with lithium and it is easily formed into a thin film. The methods of making the negative electrode mixture supported on the negative electrode current collector are the same as the methods used in the case of the positive electrode, and include a method by means of pressure forming, and a method of making the negative electrode mixture into a paste with the use of an organic solvent or the like, coating the paste onto the negative electrode current collector, drying the same and thereafter bonding these by pressing, and the like.

As the above-described separator, for example, members with a form of porous membrane, nonwoven fabric, woven fabric, or the like, comprising materials including polyolefin resins, such as polyethylene and polypropylene, fluoro-resins, nitrogen-containing aromatic polymers, and the like, can be used. Moreover, a separator comprising two or more of these materials and a laminated separator with two or more laminated layers composed of different materials may be used. As the laminated separator, a laminated separator with a nitrogen-containing aromatic polymer layer and a polyethylene layer being laminated, is suitable as the separator used for secondary batteries in terms of the heat resistance property and the performance at shutdown. As the separator, for example, the separators described in JP-A-2000-30686, JP-A-10-324758, and the like, can be included. It is desirable to reduce the thickness of the separator as much as possible, as long as the mechanical strength is maintained, so that the volume energy density of batteries increases and the internal resistance decreases. The thickness of the separator is typically about 10 to 200 μm, and preferably about 10 to 30 μm.

In the above-described electrolyte solution, the electrolytes include lithium salts, such as $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lithium salt of lower aliphatic carboxylic acid, and $LiAlCl_4$. Here, a mixture of two or more of these may be used. Among these, as the lithium salt, at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ containing fluorine is usually used.

Moreover, in the above-described electrolyte solution, as the organic solvent, for example, carbonates, such as propylene carbonate, ethylene carbonate, dimethyl carbonate, diethyl carbonate, ethylmethyl carbonate, 4-trifluoromethyl-1,3-dioxolane-2-one, and 1,2-di(methoxycarbonyloxy) ethane; ethers, such as 1,2-dimethoxyethane, 1,3-dimethoxypropane, pentafluoro propylmethyl ether, 2,2,3,3-tetrafluoropropyl difluoromethylether, tetrahydrofuran, and 2-methyltetrahydrofuran; esters, such as methyl formate, methyl acetate, and γ-butyrolactone; nitrites, such as acetonitrile and butyronitrile; amides, such as N,N-dimethylformamide and N,N-dimethylacetamide; carbamates, such as 3-methyl-2-oxazolidone; sulphur-containing compounds, such as sulfolane, dimethyl sulfoxide, and 1,3-propane sultone; or the solvents that are the same as the above-described organic solvents, apart from that a fluorine substituent is further introduced, can be used. Usually, two or more of these are mixed for use. Among them, a mixed solvent containing carbonates is preferable, with a mixed solvent of a cyclic carbonate and an non-cyclic carbonate, or a mixed solvent of a cyclic carbonate and ethers being more preferable. As the mixed solvent of cyclic carbonate and non-cyclic carbonate, a mixed solvent containing ethylene carbonate, dimethyl carbonate, and ethylmethyl carbonate is preferable because it has a wide operational temperature range and is excellent in the load characteristic and at the same time it is persistent even if graphite materials, such as natural graphite and artificial graphite, are used as the active material of the negative electrode. Moreover, it is preferable to use an electrolyte solution, which contains a lithium salt containing a fluorine, such as $LiPF_6$, and an organic solvent having a fluorine substituent, especially because it effects an excellent safety improvement. A mixed solvent containing ethers having a fluorine substituent, such as pentafluoropropyl methyl ether and 2,2,3,3-tetrafluoropropyl difluoromethyl ether, and dimethyl carbonate is excellent also in high current discharge characteristic and thus more preferable.

A solid electrolyte may be used in place of the above-described electrolyte solution. As the solid electrolyte, for example, polymer electrolytes, such as a polyethylene oxide-based polymer compound, a polymer compound containing at least one or more of a polyorganosiloxane chain or a polyoxyalkylene chain, and the like can be used. Moreover, so-called gel-type electrolytes made by impregnating polymers with a nonaqueous electrolyte solution can be also used. Moreover, use of a sulfide electrolytes, such as $Li_2S$—$SiS_2$, $Li_2S$—$GeS_2$, $Li_2S$—$P_2S_5$, and $Li_2S$—$B_2S_3$, or inorganic compound electrolytes containing sulfide, such as $Li_2S$—$SiS_2$—$Li_3PO_4$ and $Li_2S$—$SiS_2$—$Li_2SO_4$ may further improve safety.

EXAMPLES

Next, the present invention will be described more in detail using Examples. In addition, the evaluation of lithium manganese composite oxides and nonaqueous electrolyte secondary batteries comprising these composite oxides as the positive active material was carried out as follows.

1. Evaluation of Nonaqueous Electrolyte Secondary Batteries

A powder obtained by weighing the positive active material and conductive material, acetylene black, which were vacuum-dried at 120° C., so as to have a weight ratio of 8:2 and mixing the same, and a PTFE powder (manufactured by Kureha Corporation) as the binder were weighed so as to have a weight ratio of 10:1, mixed and formed into pellets of 11 mmφ. Then, in order to improve the current collectability, said pellets and an aluminum mesh (current collector) of 16 mmφ were integrated together by pressing at 40 MPa to obtain a positive electrode.

The positive electrode thus obtained; an electrolyte solution (hereinafter, may be represented by $LiPF_6$/PC) made by dissolving $LiPF_6$ into a propylene carbonate (hereinafter, may be referred to as PC) so as to have a concentration of 1 mol/liter; a polypropylene porous membrane punched into 17 mmφ, as the separator; and a lithium metal punched into 12 mmφ, as the negative electrode, were combined together to prepare a 2032 type coin battery.

With the use of the above-described coin battery, a charge and discharge test by constant-current charge and constant-current discharge was performed under the following charge and discharge conditions.

<Charge and Discharge Conditions>

Maximum charge voltage 4.9V, charging current $5.26 \times 10^{-2}$ mA/cm²

Minimum discharge voltage 2.0V, discharging current $5.26 \times 10^{-1}$ mA/cm²

2. Powder X-Ray Diffractometry of Lithium Manganese Composite Oxides

The powder X-ray diffractometry of lithium manganese composite oxides was carried out using Rotaflex RU-200B manufactured by Rigaku Corporation. The lithium manganese composite oxide was loaded into a special basal plate and the measurement was carried out by using a CuK α-ray source that is monochromatized by a single crystal bent monochromator, with a diffraction angle 2θ in the range of 10°-80°.

Comparative Example 1

Starting materials, lithium carbonate ($Li_2CO_3$, manufactured by Wako Pure Chemical Industries, Ltd., purity >99%) and manganese carbonate ($MnCO_3$, manufactured by Kojundo Chemical Laboratory, purity >99.9%) were weighed and mixed so that the molar ratio of Li:Mn became 2:1, and thereafter were formed into pellets, which were then put into an alumina boat and fired under oxygen atmosphere at 800° C. for 24 hours. The fired product was ground in a mortar to obtain Powder A1.

The powder X-ray diffractometry of Powder A1 revealed that Powder A1 had a $Li_2MnO_3$ type crystal structure (see FIG. 1).

As a result of preparing a 2032 type coin battery using Powder A1 and then conducting the charge and discharge test, the charge and discharge capacities (mAh/g) in the first cycle were found to be 49 and 36, respectively.

Example 1

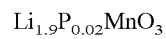

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and lithium phosphate ($Li_3PO_4$, manufactured by Wako Pure Chemical Industries, Ltd., purity >98%) were weighed and mixed so that the molar ratio of Li:P:Mn became 1.9:0.02:1, and thereafter were formed into pellets, which were then put into an alumina boat and fired under oxygen atmosphere at 800° C. for 24 hours. The fired product was ground in a mortar to obtain Powder A2.

The powder X-ray diffractometry of Powder A2 revealed that Powder A2 had a $Li_2MnO_3$ type crystal structure (see FIG. 1).

As a result of preparing a 2032 type coin battery using Powder A2 and then conducting the charge and discharge test, the charge and discharge capacities (mAh/g) in the first cycle were found to be 228 and 195, respectively.

Example 2

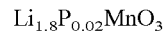

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and lithium phosphate ($Li_3PO_4$, manufactured by Wako Pure Chemical Industries, Ltd., purity >98%) were weighed and mixed so that the molar ratio of Li:P:Mn became 1.8:0.04:1, and thereafter were formed into pellets, which were then put into an alumina boat and fired under oxygen atmosphere at 800° C. for 24 hours. The fired product was ground in a mortar to obtain Powder A3.

The powder X-ray diffractometry of Powder A3 revealed that Powder A3 had a $Li_2MnO_3$ type crystal structure (see FIG. 1).

As a result of preparing a 2032 type coin battery using Powder A3 and then conducting the charge and discharge test, the charge and discharge capacities (mAh/g) in the first cycle were found to be 192 and 175, respectively.

Example 3

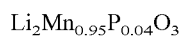
$Li_2Mn_{0.95}P_{0.04}O_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and lithium phosphate ($Li_3PO_4$, manufactured by Wako Pure Chemical Industries, Ltd., purity >98%) were weighed and mixed so that the molar ratio of Li:P:Mn became 2:0.04:0.95, and thereafter were formed into pellets, which were then put into an alumina boat and fired under oxygen atmosphere at 800° C. for 24 hours. The fired product was ground in a mortar to obtain Powder A4.

Figure 2:
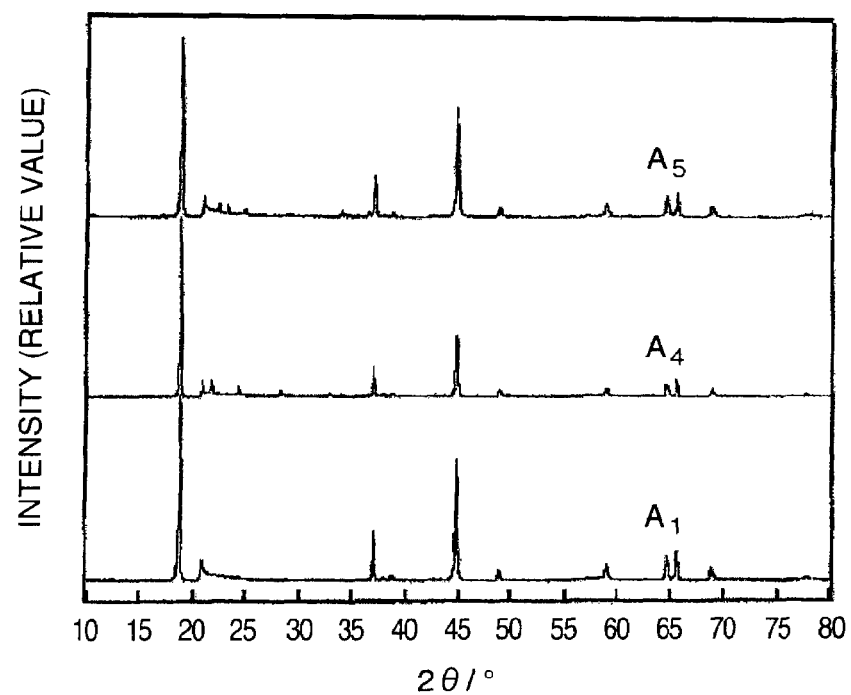
FIG. 2 is a view showing powder X ray diffraction patterns of powders A1, A4, and A5 in Examples.

The powder X-ray diffractometry of Powder A4 revealed that Powder A4 had a $Li_2MnO_3$ type crystal structure (see FIG. 2).

As a result of preparing a 2032 type coin battery using Powder A4 and then conducting the charge and discharge test, the charge and discharge capacities (mAh/g) in the first cycle were found to be 151 and 134, respectively.

Example 4

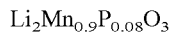
$Li_2Mn_{0.9}P_{0.08}O_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and lithium phosphate ($Li_3PO_4$, manufactured by Wako Pure Chemical Industries, Ltd., purity >98%) were weighed and mixed so that the molar ratio of Li:P:Mn became 2:0.08:0.9, and thereafter were formed into pellets, which were then put into an alumina boat and fired under oxygen atmosphere at 800° C. for 24 hours. The fired product was ground in a mortar to obtain Powder A5.

The powder X-ray diffractometry of Powder A5 revealed that Powder A5 had a $Li_2MnO_3$ type crystal structure (see FIG. 2).

As a result of preparing a 2032 type coin battery using Powder A5 and then conducting the charge and discharge test, the charge and discharge capacities (mAh/g) in the first cycle were found to be 189 and 174, respectively.

Example 5

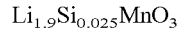
$Li_{1.9}Si_{0.025}MnO_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and silicon dioxide ($SiO_2$, manufactured by Kanto Chemical Co., Inc., amorphous, precipitated, purity >99.9%) were weighed and mixed so that the molar ratio of Li:Si:Mn became 1.9:0.025:1, and thereafter were formed into pellets, which were then put into an alumina boat and fired under oxygen atmosphere at 800° C. for 24 hours. The fired product was ground in a mortar to obtain Powder A6.

Figure 3:
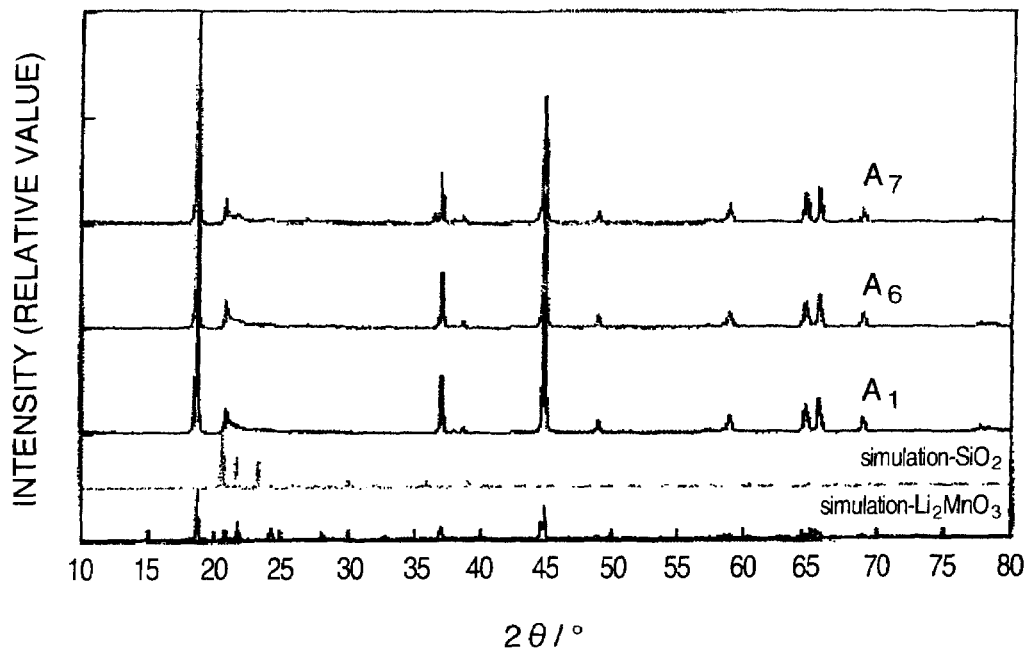
FIG. 3 is a view showing powder X ray diffraction patterns of powders A1, A6, and A7 in Examples.

The powder X-ray diffractometry of Powder A6 revealed that Powder A6 had a $Li_2MnO_3$ type crystal structure (see FIG. 3).

As a result of preparing a 2032 type coin battery using Powder A6 and then conducting the charge and discharge test, the charge and discharge capacities (mAh/g) in the first cycle were found to be 183 and 133, respectively.

Example 6

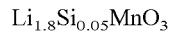
$Li_{1.8}Si_{0.05}MnO_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and silicon dioxide ($SiO_2$, manufactured by Kanto Chemical Co., Inc., amorphous, precipitated, purity >99.9%) were weighed and mixed so that the molar ratio of Li:Si:Mn became 1.8:0.05:1, and thereafter were formed into pellets, which were then put into an alumina boat and fired under oxygen atmosphere at 800° C. for 24 hours. The fired product was ground in a mortar to obtain Powder A7.

The powder X-ray diffractometry of Powder A7 revealed that Powder A7 had a $Li_2MnO_3$ type crystal structure (see FIG. 3).

As a result of preparing a 2032 type coin battery using Powder A7 and then conducting the charge and discharge test, the charge and discharge capacities (mAh/g) in the first cycle were found to be 123 and 122, respectively.

Example 7

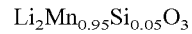
$Li_2Mn_{0.95}Si_{0.05}O_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and silicon dioxide ($SiO_2$, manufactured by Kanto Chemical Co., Inc., amorphous, precipitated, purity >99.9%) were weighed and mixed so that the molar ratio of Li:Si:Mn became 2.0:0.05:0.95, and thereafter were formed into pellets, which were then put into an alumina boat and fired under oxygen atmosphere at 800° C. for 24 hours. The fired product was ground in a mortar to obtain Powder A8.

Figure 4:
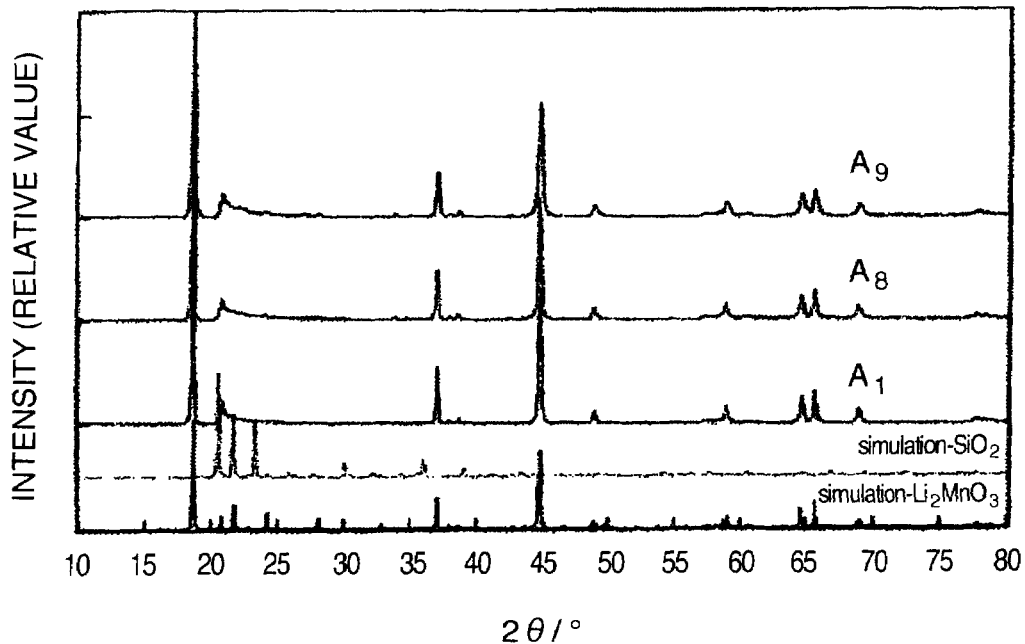
FIG. 4 is a view showing powder X ray diffraction patterns of powders A1, A8, and A9 in Examples.

The powder X-ray diffractometry of Powder A8 revealed that Powder A8 had a $Li_2MnO_3$ type crystal structure (see FIG. 4).

As a result of preparing a 2032 type coin battery using Powder A8 and then conducting the charge and discharge test, the charge and discharge capacities (mAh/g) in the first cycle were found to be 350 and 273, respectively.

Example 8

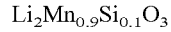
$Li_2Mn_{0.9}Si_{0.1}O_3$

Starting materials, lithium carbonate ($Li_2CO_3$, manufactured by Wako Pure Chemical Industries, Ltd., purity >99%), manganese carbonate ($MnCO_3$, manufactured by Kojundo Chemical Laboratory, purity >99.9%) and silicon dioxide ($SiO_2$, manufactured by Kanto Chemical Co., Inc., amorphous, precipitated, purity >99.9%) were weighed and mixed so that the molar ratio of Li:Si:Mn became 2.0:0.1:0.9, and thereafter were formed into pellets, which were then put into an alumina boat and fired under oxygen atmosphere at 800° C. for 24 hours. The fired product was ground in a mortar to obtain Powder A9.

The powder X-ray diffractometry of Powder A9 revealed that Powder A9 had a $Li_2MnO_3$ type crystal structure (see FIG. 4).

As a result of preparing a 2032 type coin battery using Powder A9 and then conducting the charge and discharge test, the charge and discharge capacities (mAh/g) in the first cycle were found to be 306 and 259, respectively.

The invention claimed is:

1. A positive electrode for a nonaqueous electrolyte secondary battery, comprising a lithium manganese composite oxide having a $Li_2MnO_3$ type crystal structure, wherein a part of the Li in a lithium manganese oxide is substituted by a doping element of P and the lithium manganese oxide is represented by a formula $Li_{2-x}P_{x/5}MnO_3$, wherein x is a value within the range of greater than 0 and 0.6 or less.

2. A nonaqueous electrolyte secondary battery, comprising a positive electrode for a nonaqueous electrolyte secondary battery, the positive electrode comprising a lithium manganese composite oxide having a $Li_2MnO_3$ type crystal structure, wherein a part of the Li in a lithium manganese oxide is substituted by a doping element of P and the lithium manganese oxide is represented by a formula $Li_{2-x}P_{x/5}MnO_3$, wherein x is a value within the range of greater than 0 and 0.6 or less.

* * * * *